United States Patent [19]

Hughes

[11] 3,741,993

[45] June 26, 1973

[54] MALEIC ANHYDRIDE PROCESS

[75] Inventor: William G. Hughes, Plainfield, N.J.

[73] Assignee: Tenneco Chemicals, Inc., Saddle Brook, N.J.

[22] Filed: Feb. 3, 1970

[21] Appl. No.: 8,364

[52] U.S. Cl............................ 260/346.8, 260/346.4
[51] Int. Cl............................................. C07c 57/19
[58] Field of Search................................. 260/346.8

[56] References Cited
UNITED STATES PATENTS

| | | | |
|---|---|---|---|
| 2,415,531 | 2/1947 | Porter | 260/346.8 |
| 2,114,798 | 4/1938 | Foster | 260/346.8 |

OTHER PUBLICATIONS

Sherwood, Chimie Et Industrie–Genie, Chimique (August 1969) Vol. 102 No. 3 p. 263–270.

*Primary Examiner*—Alex Mazel
*Assistant Examiner*—Bernard Dentz
*Attorney*—Daniel J. Reardon, George E. Lilly and Evelyn Berlow

[57] ABSTRACT

An improved process for the manufacture of maleic anhydride by the oxidation of benzene wherein the crude product stream, after condensation and separation of maleic anhydride, is scrubbed with water to recover an aqueous solution of maleic acid to obtain tail gas containing unreacted benzene, and the resulting tail gas is subjected to a chilled aqueous scrubbing step to effect removal of water-soluble constituents, reduce the amount of water vapor in the tail gas, and lower the temperature of the tail gas. From 0 to 65 percent of the thus treated tail gas may be recycled to the oxidation step to achieve certain processing benefits; while the unrecycled tail gas is scrubbed with a hydrocarbon oil to separate the benzene therefrom and to vent the tail gases, substantially free from benzene, to the atmosphere. The hydrocarbon oil containing the benzene is then stripped with steam to separate and recover the benzene.

5 Claims, 1 Drawing Figure

PATENTED JUN 26 1973   3,741,993
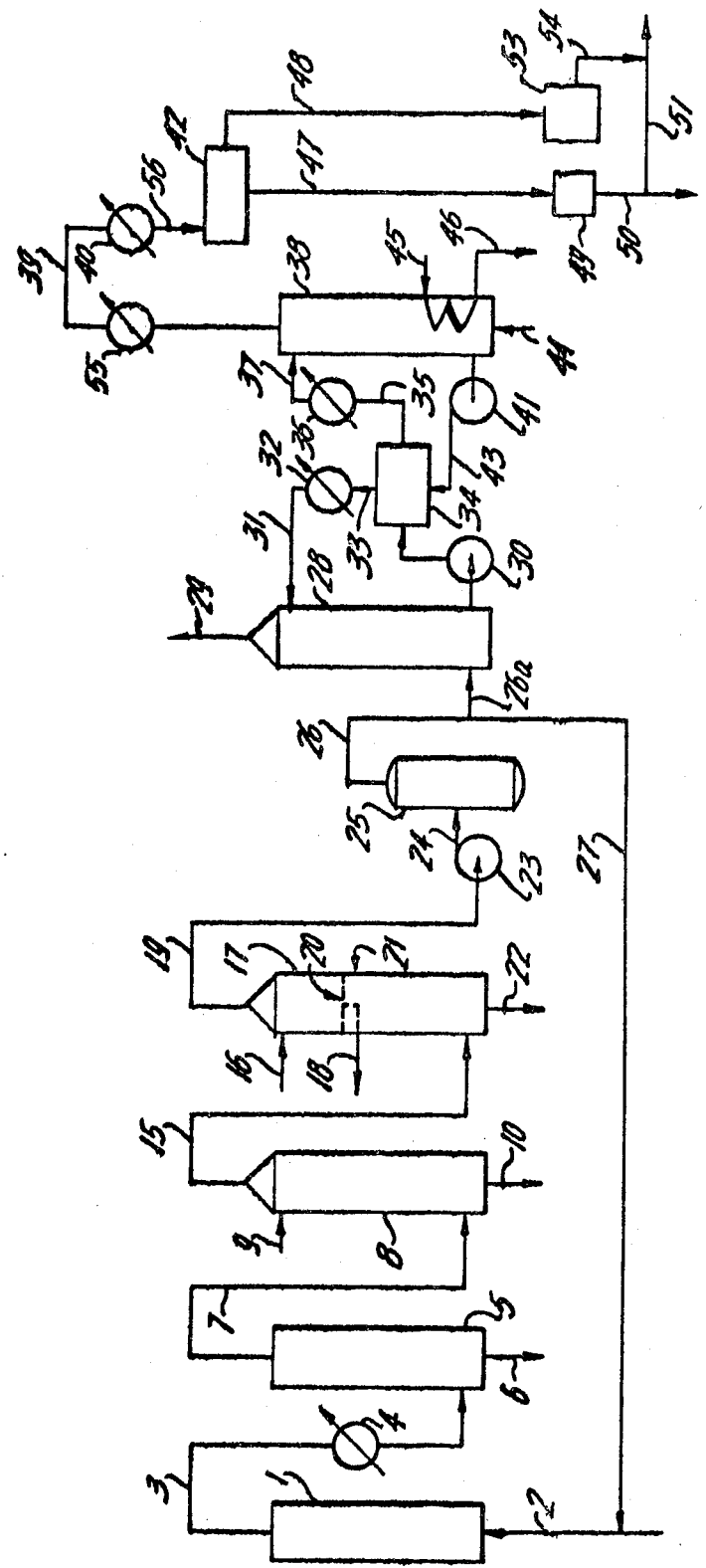

MALEIC ANHYDRIDE PROCESS

This invention relates to an improved maleic anhydride process, and more particularly to the treatment of tail or off gases obtained from a maleic anhydride process involving the oxidation of benzene whereby a portion of said treated tail gas may be recycled to the reaction zone and unrecycled tail gas is separately treated to remove substantially all of the unreacted benzene therefrom.

An important commercial process for making maleic anhydride consists of the vapor phase catalytic oxidation of mononuclear aromatic compounds by passage of the organic vapors in admixture with an oxygen-containing gas in contact with a suitable oxidation catalyst. The production of maleic anhydride by such a process of catalytic oxidation using benzene has been carried out commercially for many years. Catalysts most frequently used are those containing oxides of vanadium as the principal active catalytic ingredient. The vanadium oxides may be coated or supported on an inert support.

This catalyst is generally placed into tubular converters having relatively small diameter tubes which are surrounded by a bath of heat-removing liquid such as molten salt, and vapors of the benzene admixed with air or other oxidizing (oxygen-containing gas) are passed through the tubes. Commercial operations may be defined, for example, by operating a converter 6 feet in diameter with benzene-air feed mixtures, to give 60-70 lbs. of maleic anhydride for each 100 pounds of benzene charged, with bath temperatures of about 400°-500°C., 1.2-1.5 mole percent benzene-air mixtures and loadings of about 40-50 grams of benzene per hour per tube.

The gaseous reaction product mixture containing maleic anhydride, unreacted gases, and by-products is initially condensed and maleic anhydride separtated therefrom. The uncondensed gaseous product mixture is then conventionally scrubbed with water to absorb maleic anhydride and to recover an approximately 40 percent aqueous solution of maleic acid. The tail gas, sometimes referred to as off gas, obtained from the water scrubbing step may contain substantial amounts of unreacted benzene. In addition the tail gas will contain certain acidic oxidation by-products which cannot be removed in the water scrubbing because of the requirement that the aqueous maleic acid stream recovered therefrom must have a concentration of at least 40 percent maleic acid. Obviously the total recovery of maleic acid in this scrubber is restricted by the need to maintain a high concentration in the absorbate for economical conversion to maleic anhydride in subsequent dehydration steps.

Heretofore the tail gas has been vented to the atmosphere, but it is now recognized that the relatively high concentration of benzene in this gas poses a potential air pollution problem. Incineration of the tail gas would be costly, difficult to operate, and economically wasteful when substantial amounts of benzene are present. Proposals to recycle all or a portion of the tail gas have encountered numerous operational objections. The presence of acidic by-products raises serious corrosion problems necessitating the use of special and costly equipment. With total recycle, an intermediate carbon dioxide removal step and the use of pure oxygen to avoid recycle of large amounts of inert gas, e.g., nitrogen would be required. With only partial recycle of tail gas, the problems associated with venting and incineration still exist. It would be advantageous therefore to provide a method whereby the tail gas could be treated in such a manner that acidic by-products could be substantially removed and benzene recovered from the tail gas prior to venting. Further advantages would accrue, if a portion of the tail gas, following removal of acidic by-products, could be recycled to the reaction zone, as desired.

In accordance with one aspect of the present invention, the advantages discussed above are attained by subjecting the tail gas, obtained from the conventional water scrubbing step, to a second aqueous scrubbing step with chilled water to remove residual maleic anhydride, maleic acid as well as other water-soluble components. Since there is no limitation on the amount of water that can be employed in this step, substantially all of the water-soluble components, including the acidic by-products, can be removed from the tail gas. Moreover, by utilizing chilled water other advantages are achieved; firstly, temperature of the tail gas is reduced thereby facilitating benzene separation in a subsequent treatment; and secondly, the amount of water vapor in the tail gas is lowered, the importance of which will be discussed below.

The thus treated tail gas is then passed to a benzene removal step. Conventional and well known procedure may be employed to reduce the benzene content of the tail gas below contaminating levels and to recover benzene for recycling or other uses. Although this step will be discussed below principally in conjunction with a procedure involving scrubbing the tail gas with a hydrocarbon oil to extract benzene, it will be understood that the benzene may be removed by adsoprtion on activated carbon or silica, etc. without departing from the broad concepts of the present invention.

Another aspect of the invention resides in the discovery that, if desired, a portion of the tail gas obtained from the chilled water scrubbing may be recycled directly back to the synthesis reaction zone prior to benzene removal. Broadly stated, the amount of tail gas recycled may vary from about 0 to 65 percent by volume. When recycling is desired, the preferred amount of recycled tail gas will vary from about 40 to 65 percent by volume. The absence of acidic by-products in the tail gas permits recycling without the use of specially constructed equipment. Since the tail gas obtained by the method of this invention is also characterized by a lower water vapor content than tail gas recovered after the conventional aqueous scrubbing step, the disadvantages resulting from a water build-up in the reaction mixture, with an attendant decrease in maleic anhydride recovery following condensation of the gaseous reaction product mixture, are avoided.

As previously noted, certain processing benefits are realized by recycling a portion of the treated tail gas. To begin with, the carbon dioxide in the recycled gas permits the use of additional oxygen gas in the reaction mixture without encountering explosive conditions. The yield of maleic anhydride is increased, and longer catlyst life can be achieved by carrying out the reaction at lower temperatures and consequently at lower conversions, if desired.

In general, the improved overall maleic anhydride process of this invention comprises the following sequential steps.

A. Vapor phase oxidation of benzene with an oxygen-containing gas such as air, pure oxygen, or mixtures thereof with nitrogen in the presence of a vanadium-containing catalyst;

B. Cooling the resulting gaseous reaction product mixture to a temperature sufficient to effect condensation of maleic anhydride, generally a temperature of about 57°C. or somewhat lower;

C. Separating condensed maleic anhydride from the gaseous reaction product mixture;

D. Scrubbing the recovered gaseous reaction product mixture with water and recirculated maleic acid solution, reducing the pot temperature within the range of about 35° to 45°C. to obtain an aqueous absorbate having a maleic acid concentration of not less than 40 percent and a tail gas containing unreacted benzene, maleic anhydride and/or maleic acid as well as oxidation by products;

E. Scrubbing the tail gas with water so as to reduce its temperature within the range of about 5° to 25°C., and preferably about 7° to 15°C., to extract substantially all of the maleic anhydride and/or maleic acid as well as the water-soluble oxidation by-products therefrom and to reduce the water content;

F. Scrubbing the cooled tail gas with a hydrocarbon oil to extract substantially all of the benzene, and venting the benzene free tail gas to the atmosphere; and G. Recovering the benzene from the hydrocarbon oil solution by distillation.

As previously discussed, process steps (A) through (D) may be the conventional treatments known to the art. As also discussed, by practicing the improved process of this invention it is possible, if desired, to recycle to the synthesis step (A) a portion of the treated tail gas recovered from the chilled aqueous scrubbing step (E). With recycle, a typical gaseous feed mixture passed to the synthesis reaction zone will contain 11–13% oxygen, 15–3% benzene, 3–5% carbon monoxide, 4–6% carbon dioxide, plus nitrogen and water vapor. The lower oxygen content assures that the mixture is out of the explosive range. If conversion is 90 percent in the oxidation, the tail gas will contain 2–8% oxygen.

The portion of the tail gas recovered from the second aqueous scrubbing step which is not recycled is subjected to sequential treatments to remove and recover substantially all of the unreacted benzene therefrom. In general, the procedure employed comprises passing the tail gas into an oil scrubber wherein it is countercurrently contactd with a liquid hydrocarbon which will extract benzene. The hydrocarbon solvent may be a petroleum oil having a boiling point within the range of about 260° to 360°C. Illustrative solvents include fuel oils No. 1, No. 2, mineral seal oil, diesel oil No. 20, mixtures thereof, and the like.

The resulting extract phase is steam stripped to remove benzene overhead, and the benzene is then separated from water and any residual oil by conventional cooling and phase separation steps.

In order that the invention may be understood more fully, reference should be had to the following examples and the accompanying drawing which is a schematic flow sheet of the improved maleic anhydride process.

EXAMPLE 1

Referring now to the drawing, a mixture of air, recycle gas and benzene is passed via line 2 into reactor 1 containing a supported vanadium oxide. The benzene is oxidized at a hot spot temperature within the range of about 460° to 470°C. The resulting gaseous reaction product mixture recovered via line 3 is cooled to a temperature of about 55° to 57°C. in condenser 4 and passed to separator 5. Condensed maleic anhydride is recovered via line 6, while an uncondensed gaseous mixture is withdrawn overhead via line 7 and into the lower portion of scrubber tower 8. Water at a temperature of about 30° to 35°C. is passed into tower 8 via line 9. An approximately 40 percent aqueous solution of maleic acid is recovered from the bottom of tower 8 via line 10 to a dehydration unit (not shown) to complete the conversion to maleic anhydride. The total recovery of maleic acid in scrubber tower 8 is restricted by the need to maintain a high concentration of the maleic acid in the absorbate for economical conversion to maleic anhydride in the subsequent dehydration steps. The unabsorbed gases about 40°C. pass via upper outlet line 15 into the lower portion of scrubber tower 17. Cold water at a temperature of about 5° to 10°C. enters the upper portion of scrubber tower 17 via line 16. An aqueous absorbate stream is discharged from tower 17 via line 18 to a water chiller (not shown) wherein the water and impurities picked up are purged automatically from the chilled water system. Tower 17 contains a sieve or bubble cap tray 20 with a trap-out, wo that the gas may pass through, but the water is trapped and passed via line 18 to the water chiller. Ordinary cooling water, for example, water from a cooling tower (not shown) at about 25°C. is passed via line 21 to tower 17 at a point just below tray 20. This procedure serves to cool the gas from about 40°C. to 28°C. as well as to absorb most of the impurities and some of the water content. The absorbate is discharged to the sewer via line 22. Overhead line 19 leads a benzene-containing gas stream (having a temperature of about 7° to 15°c.) from tower 17 to booster pump 23 and line 24 into knock-out drum 25. A gas stream passes from knock-out drum 25 via lines 26 and 26a into the lower part of an oil scrubber tower 28. A part (e.g., 50 percent) of the gas stream of line 26 is removed via line 27 and recycled into the oxidation reactor. An oil stream, for example, No. 2 fuel oil enters the upper portion of tower 28 via line 31 and proceeds downward, scrubbing the benzene from the tail gas. Residual tail gas is vented from tower 28 via line 29. A benzene rich oil stream (8° to 15°C.) from the lower portion of tower 28 via line 30 to heat exchanger 34 where it is heated by hot stripped oil (185° to 195°C.) which enters heat exchanger 34 via line 43. The benzene rich oil leaves heat exchanger 34 via line 35 and enters preheater 36 where it is further heated with steam (250 psig.). The hot, benzene rich oil is passed via line 37 to the upper portion of benzene stripper tower 38 and passes downwardly while being stripped of benzene by a stream of upwardly flowing low pressure steam, which is fed via line 44 to the bottom portion of tower 38. The temperature of the oil at the base of tower 38 is maintained at a high level of about 185° to 195°C. by steam entering a coil via line 45, condensate leaving the coil via line 46. Hot stripped oil is pumped from tower 38 via pump 41 and line 43 to heat exchanger 34 and through heat exchanger 32 in which it is cooled by means of chilled water (5°C.). The stripped oil is then passed via line 31 to the top of tower 28.

Referring now to stripper tower 38:steam, recovered benzene, and a small quantity of oil leave the top of tower 38 in the form of hot vapor through line 39. Vaporized oil is condensed in dephlegmator 55 and may be refluxed to tower 38 (not shown). Benzene and steam are passed via line 39 into condenser 40 for total condensation. The resulting condensate flows via line 56 to decanter 42 where it separates into an upper layer (benzene) and a lower layer (water). The latter is passed via line 47 to catch tank 49. If the separation in decanter 42 is incomplete, a second separation may be made with the benzene returned via line 51 to a feed tank (not shown), while the water is passed via line 50 to a sewer. The benzene layer flows from decanter 42 via line 48 to receiver 53. Benzene is withdrawn via line 54 and passed to the benzene feed tank (not shown) for recycle to the reaction zone via line 2.

The following tables contains results of a typical maleic anhydride tail gas purification procedure in accordance with this invention as described above. The compositions of the various streams are set forth as mole percents in Table I and as moles in Table II.

ture by two independent controllers. The temperature gradient is kept generally at ± 1°C. by mechanical stirring.

The gas blending equipment has sources of air, nitrogen and carbon monoxide with the appropriate gas regulators, pressure indicators, flow meters and control valves. The benzene is introduced into the gases by sparging with air or nitrogen through a vessel containing benzene held in a constant temperature bath. The gaseous benzene lines are steam traced.

Maleic anhydride produced is scrubbed from the exit gas, and the resulting maleic acid is titrated using the first end point for this strong acid. The amount of benzene used in a run is determined by weighing the benzene cylinder. The amount of conversion of benzene and oxygen is determined by chromatographic analysis, which is also used for CO + $CO_2$ analysis. Weak acid and carbonyls are determined by titration of the product solution. The catalysts are generally evaluated 24 hours a day and 7 days a week. Individual runs for analysis are made over 4 to 7 hours, with 24 hour runs being made now and then to improve the material balance when optimum conditions have been reached.

TABLE I

| Components | Line 15 | Line 19 | Line 26a | Line 29 | Line 37 | Line 39 | Line 48 |
|---|---|---|---|---|---|---|---|
| Benzene | 0.288 | 0.307 | 0.307 | 0.0025 | 3.76 | 7.13 | 99.851 |
| Oxygen | 1.752 | 1.870 | 1.870 | 1.870 | | | |
| Nitrogen | 78.000 | 83.368 | 83.368 | 83.368 | | | |
| Carbon monoxide | 5.185 | 5.542 | 5.542 | 5.542 | | | |
| Carbon dioxide | 7.450 | 7.959 | 7.959 | 7.959 | | | |
| Water | 7.300 | 0.952 | 0.952 | 0.952 | | 92.66 | |
| Maleic acid | Neg. | | | | | | |
| Fuel oil | | | | | 96.24 | 0.214 | 0.143 |

TABLE II

| Components | Line 15 | Line 19 | Line 26a | Line 29 | Line 37 | Line 39 | Line 48 |
|---|---|---|---|---|---|---|---|
| Benzene | 8.87 | 8.87 | 4.435 | 0.036 | 4.340 | 4.339 | 4.330 |
| Oxygen | 54.00 | 54.00 | 27.00 | 27.00 | | | |
| Nitrogen | 2,407.00 | 2,407.00 | 1,203.5 | 1,203.50 | | | |
| Carbon monoxide | 160.00 | 160.00 | 80.00 | 80.00 | | | |
| Carbon dioxide | 229.80 | 229.80 | 114.90 | 114.90 | | | |
| Water | 225.00 | 27.50 | 13.80 | 13.80 | | 56.40 | |
| Maleic Acid | 0.05 | | | | | | |
| Fuel oil | | | | | 111.10 | 0.130 | 0.006 |
| Totals | 3,084.7 | 2,887.2 | 1,443.6 | 1,439.2 | 115.4 | 60.87 | 4.336 |

The foregoing description and data show that the tail gas or off gas purification process of this invention can effectively clean up the tail gas for recycling (after the second aqueous scrubbing step) as well as recover substantially all of the unreacted benzene from unrecycled tail gas, In the following examples, a recycle stream comprising about 0.3% benzene, 2.4% carbon monoxide, 3.4% carbon dioxide, 4.5% oxygen, 88.4% nitrogen and 1.0% water vapor was obtained from the tail gas after the second aqueous scrubbing step (50 percent of the gas was employed) is blended with fresh feed gases and passed to the reaction zone.

EXAMPLE 2

The reactor used in this run has a 3 foot preheat section plus a 9 catalyst bed. It is made of 1 inch carbon steel and has an ID of approximately 0.87 inch. It is the type of tube used in large scale maleic anhydride reactors. Molten salt is used to preheat the reactant gas and to cool the catalyst bed once the oxidation reaction is initiated. The salt bath is held at the desired tempera- The reactor was loaded with 975 ml. of supported vanadium oxide catalyst at 250°C. and the temperature was raised to 380°C. with an air purge. Benzene was introduced at 380°C. with the air. The catalyst was evaluated with the air and benzene for 90 hours. The yield of maleic anhydride was 67.4 to 70 mole percent at benzene throughput of 6.9 to 7.5 pounds per tube day (TD) and a benzene concentration of 1.34 to 1.52 mole percent. The salt temperature was 378° to 384°C. and the reaction temperature was 430° to 435°C.

Two runs were made over a 30 hour period with the recycle flow. The reaction conditions were as follows:

GAS COMPOSITION

| Component | Actual Composition |
|---|---|
| $O_2$ | 11–11.9 |
| $N_2$ | Balance |
| $CO_2$ | 1.0–1.7 |
| CO | 1.1–1.3 |
| $C_6H_6$ | 1.9–2.2 |
| $H_2O$ | 0.8–1.1 |

REACTOR CONDITIONS

| Run Number | A | B |
|---|---|---|
| Salt Temperature | 384°C. | 400°C. |
| Reaction Temperature | 464°C. | 499°C. |
| $C_6H_6$ Throughput | 9.5 lbs/TD | 9.8 lbs/TD |
| $C_6H_6$ Concentration | 1.99 Mole % | 2.20 Mole % |

The product distribution for these runs A and B was as follows:

| Run Number | A | B |
|---|---|---|
|  | Mole % | Mole % |
| Maleic Anhydride | 62.3 | 62.3 |
| Unreacted $C_6H_6$ | 8.2 | 11.6 |
| $C_6H_6$ Converted to $CO+CO_2$ | 21.1 | 21.8 |
| Weak Acids | 3.4 | 1.5 |
| Carbonyls | 5.1 | 3.2 |
| Total: | 100.1 | 100.4 |

The off gas contained 4.5% $O_2$ instead of the expected 2% which was due in part to the lower benzene concentration.

EXAMPLE 3

The reactor of Example 2 was recharged with catalyst. Only one air-benzene run was made with an indicated yield of 67 mole percent maleic anhydride at a benzene throughput of 7.9 lbs. $C_6H_6$/TD. The recycle blend of 11% $O_2$, 84% $N_2$, 2.6% CO and 2% benzene was evaluated for 600 hours at throughputs of 10 lbs. $C_6H_6$/TD. The yield of maleic anhydride lined out at 60–62 mole % excluding the benzene which would be partially recovered by recycle. The reaction temperature ranged from 460 to 470°C.

After 600 hours on stream the system was changed back to air and benzene, with benzene throughputs of about 7.8 $C_6H_6$/Tube Day. The yield was about 62–64 mole percent.

While particular embodiments of this invention are shown above, it will be understood that the invention is obviously subject to variations and modifications without departing from its broader aspects. Thus, for example, the process may be employed for the production of various dicarboxylic acid anhydrides such as phthalic anhydride from naphthalene, methyl naphthalene, and the like. Moreover, the benzene feed may be replaced by sucn mononuclear aromatic hydrocarbons as toluene and xylene.

What is claimed is:

1. In a vapor phase process for the manufacture of maleic anhydride that comprises the following sequential steps:
    a. contacting benzene and an oxygen-containing gas with a vanadium-containing catalyst;
    b. cooling the resulting gaseous reaction product mixture to a temperature sufficient to effect condensation of maleic anhydride;
    c. separating the condensed maleic anhydride; and
    d. scrubbing the uncondensed gaseous reaction product mixture with water to reduce the temperature to about 35° to 45°C. to obtain an aqueous absorbate having a maleic acid concentration of not less than about 40 percent and a tail gas containing unreacted benzene, oxidation by-products, water vapor, and residual maleic anhydride or maleic acid; the improvement that comprises the following combination of steps:
    e. scrubbing the tail gas obtained in Step (d) with chilled water to reduce its temperature to about 5° to 25°C., whereby substantially all of the water-soluble oxidation by-products, maleic anhydride, and/or maleic acid are extracted threfrom and the water content of the tail gas is reduced;
    f. recovering a cooled benzene-containing tail gas;
    g. recycling from 0 to 65 percent by volume of the cooled benzene-containing tail gas to Step (a);
    h. scrubbing the remaining 35 percent to 100 percent of the cooled benzene-containing tail gas with a hydrocarbon oil to extract substantially all of the benzene therefrom, and venting the benzene-free tail gas to the atmosphere; and
    i. recovering benzene from the hydrocarbon oil solution.

2. The process of claim 1 wherein in Step g from 40 to 65 percent by volume of the cooled benzene-containing tail gas is recycled to Step a.

3. The process of claim 1 wherein in Step g about 50 percent by volume of the cooled benzene-containing tail gas is recycled to Step a.

4. The process of claim 1 wherein the hydrocarbon oil used in Step h is a petroleum oil having a boiling point in the range of about 260° to 360°C.

5. The process of claim 1 wherein the hydrocarbon oil used in Step h is fuel oil.

\* \* \* \* \*